(12) United States Patent
Lail et al.

(10) Patent No.: US 11,559,763 B2
(45) Date of Patent: Jan. 24, 2023

(54) REGENERABLE SOLVENT MIXTURES FOR ACID-GAS SEPARATION

(71) Applicant: Research Triangle Institute, Research Triangle Park, NC (US)

(72) Inventors: Marty Lail, Raleigh, NC (US); Luke Coleman, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 17/185,301

(22) Filed: Feb. 25, 2021

(65) Prior Publication Data

US 2021/0178316 A1    Jun. 17, 2021

Related U.S. Application Data

(62) Division of application No. 16/058,395, filed on Aug. 8, 2018, now Pat. No. 10,960,345, which is a division
(Continued)

(51) Int. Cl.
*B01D 53/14* (2006.01)
*B01D 53/78* (2006.01)
(Continued)

(52) U.S. Cl.
CPC ..... *B01D 53/1456* (2013.01); *B01D 53/1425* (2013.01); *B01D 53/1475* (2013.01); *B01D 53/1493* (2013.01); *B01D 53/485* (2013.01); *B01D 53/507* (2013.01); *B01D 53/56* (2013.01); *B01D 53/62* (2013.01); *B01D 53/78* (2013.01); *B01D 2252/204* (2013.01); *B01D 2252/205* (2013.01); *B01D 2252/30* (2013.01); *B01D 2252/504* (2013.01); *B01D 2257/302* (2013.01);
(Continued)

(58) Field of Classification Search
None
See application file for complete search history.

(56) References Cited

U.S. PATENT DOCUMENTS

2004/0253159 A1   12/2004   Hakka et al.
2006/0167235 A1   7/2006   Moody
(Continued)

FOREIGN PATENT DOCUMENTS

CA    2831676        10/2012
DE    102008007087   8/2009
(Continued)

OTHER PUBLICATIONS

Santanilla et al., "P2Et Phosphazene: A Mild, Functional Group Tolerant Base for Soluble, Room Temperature Pd-Catalyzed C—N, C—O, and C—C CrossCoupling Reactions." Org. Lett. (2015) vol. 17, pp. 3370-3373.*
(Continued)

*Primary Examiner* — Daniel Berns
(74) *Attorney, Agent, or Firm* — Womble Bond Dickinson (US) LLP

(57) ABSTRACT

A solvent system for the removal of acid gases from mixed gas streams is provided. Also provided is a process for removing acid gases from mixed gas streams using the disclosed solvent systems. The solvent systems may be utilized within a gas processing system.

12 Claims, 6 Drawing Sheets

Related U.S. Application Data of application No. 14/382,108, filed as application No. PCT/US2013/028660 on Mar. 1, 2013, now Pat. No. 10,065,148.

(60) Provisional application No. 61/606,057, filed on Mar. 2, 2012.

(51) Int. Cl.
    *B01D 53/62*     (2006.01)
    *B01D 53/56*     (2006.01)
    *B01D 53/48*     (2006.01)
    *B01D 53/50*     (2006.01)

(52) U.S. Cl.
    CPC .. *B01D 2257/308* (2013.01); *B01D 2257/404* (2013.01); *B01D 2257/504* (2013.01); *B01D 2258/0283* (2013.01)

(56) References Cited

U.S. PATENT DOCUMENTS

2009/0291872 A1   11/2009   Bara et al.
2009/0301996 A1   12/2009   Visintin et al.
2012/0294785 A1   11/2012   Murai et al.

FOREIGN PATENT DOCUMENTS

WO   WO 2010/0134926   11/2010
WO   WO 2012/031281   3/2012
WO   WO 2012/034003   3/2012

OTHER PUBLICATIONS

"Acros Organics 2000/01 Catalog of Organics and Fine Chemicals" (c) 2001 Fisher Scientific Co., LLC.

Bonhote et al., "Hydrophobic, Highly Conductive Ambient-Temperature Molten Salts," *Inorg. Chemistry*, 1996, vol. 35, pp. 1168-1178.

Masuda et al., "Studies on the solvent dependence of the carbamic acid formationfiom w-(1-naphthyl)alkylamines and carbon dioxide." *Tetrahedron*, vol. 61 (2005), pp. 213-229.

Srivastava, "An Efficient, Eco-Friendly Process for Aldol and Michael Reactions of Trimethylsilyl Enolate Over Organic Base-Functionalized SBA-15 Catalysts" *J. Mol. Catal. A: Chemical*, vol. 264 (2007), pp. 146-152.

Wang et al., "Carbon Dioxide Capture by Superbase-Derived Protic Ionic Liquids," *Angew. Chem. Int. Ed.*, 2010, vol. 49, pp. 5978-5981.

\* cited by examiner

REGENERABLE SOLVENT MIXTURES FOR ACID-GAS SEPARATION

CROSS-REFERENCE TO RELATED APPLICATIONS

The present application is a divisional of U.S. patent application Ser. No. 16/058,395, filed Aug. 8, 2018, which is a divisional of U.S. application Ser. No. 14/382,108, filed Aug. 29, 2014, which is a U.S. National Phase Patent Application of PCT/US2013/028660, filed Mar. 1, 2013, which claims priority to U.S. Provisional Patent Application No. 61/606,057, filed Mar. 2, 2012, the disclosures of which are incorporated herein by reference in their entireties.

FIELD OF THE INVENTION

The present invention relates to solvent systems for the removal of specific components of gas streams, as well as devices and methods using such systems. More specifically, the invention can provide for removal of acid gases, such as $CO_2$, $SO_2$, COS, $CS_2$ and NOx. The invention further can provide for continuous operation of devices and methods using the system. Further, the inventive methods can utilize multiple absorption/desorption means, including gas absorption/desorption and/or phase-enhanced absorption/desorption.

BACKGROUND OF THE INVENTION

Various strategies are being pursued to minimize the production and/or release of undesirable emissions from combustion processes. One such strategy is the development of technologies for the specific removal of acid gases from gas mixtures, such as the exhausts of carbon combustion processes. The separation of acid gases, such as $CO_2$, from gas mixtures has been carried out industrially for over a hundred years, although no known process has been used on a large scale such as that required by large, industrial power plants. Of the numerous processes used for $CO_2$ separation, current technology mainly focuses on the use of various solvents, such as alkali carbonates in the BENFIELD™ Process (UOP, LLC), alcoholamines in the ECONAMINE FG PLUS™ process (Fluor Corporation), and alcohols, diols, and ethers in the RECTISOL® process (Lurgi, GMBH) and the SELEXOL™ solvent (The Dow Chemical Company). In a typical solvent-based process, the gas mixture to be treated is passed through a liquid solvent that interacts with acidic compounds in the gas stream (e.g., $CO_2$ and $SO_2$) and separates them from non-acidic components. The liquid becomes rich in the acid-gas components, which are then removed under a different set of operating conditions so that the solvent can be recycled for additional acid-gas removal.

Methods for removal of the acid-gas components from rich solvents involve pressure and temperature change. Depending on the temperature of the gas mixture and the partial pressure of the acid-gas in the mixture, certain solvents are preferred for specific applications. When a solvent operates to interact with an acid-gas by chemical absorption, an exothermic chemical reaction occurs. The reversal of this reaction requires at least the amount of energy to be added back to the rich solvent that was produced by the forward reaction, not to mention the energy needed to bring the rich solvent to the temperature where reversal is appreciable and to maintain conditions to complete the reverse reaction to an appreciable extent. The energy required to obtain purified acid-gas from the rich solvent contributes to the cost of the purified product. In particular, the cost of the purified acid-gas has become a significant hurdle for the application of solvent technologies to fossil-fuel fired power plants for the removal of acid gases from flue gas.

Non-aqueous solvents have been used to remove $CO_2$ from natural gas streams and require less energy for regeneration. Single-component alcoholic physisorption solvents such as RECTISOL™ and SELEXOL® are commercially available for $CO_2$ separation but perform poorly in the humid, near-ambient pressure conditions associated with flue gas. Alcoholamines and amines have been combined with alcohols, diols, and cyclic carbonates by various researches to form "hybrid solvents" whose reaction mechanisms and kinetics have been studied in the literature. See, Alvarez-Fuster, et al., *Chem. Eng. Sci.* 1981, 36, 1513; Ali, et al., *Separation and Purification Technology* 2000, 18, 163; Usubharatana, et al., *Energy Procedia* 2009, 1, 95; and Park, et al., *Sep. Sci. Technol.* 2005, 40, 1885. In addition, a process known as the "phase-transitional absorption method" has been disclosed in relation to methods for deacidizing gaseous mixtures, which generally consists of the absorption of acid gases into an "absorbing phase" of less density than water consisting of a nitrogenous base and an alcohol, followed by transfer of the absorbed acid gas into an aqueous "carrier phase". The aqueous carrier phase can be regenerated in a regenerator. The process claims to save energy by absorbing an acid gas at a faster rate than in an absorbing phase alone, and by avoiding the energy required to pump a rich absorbing phase to a separate regenerator by utilizing gravity to transfer the acid gas between phases in a single column for absorption and regeneration.

Another group of non-aqueous liquids which could be developed to address many of the problems affecting $CO_2$ solvents are room temperature switchable ionic liquids. These equimolar mixtures of amidine or guanidine nitrogen bases and alcohols are non-ionic room temperature liquids that react with $CO_2$ to form room-temperature ionic liquids. Typically, the conductivity of equimolar mixtures increases by one or two orders of magnitude when $CO_2$ is added. Importantly, these solvents have higher $CO_2$ loadings than some aqueous amines, and are regenerable under milder conditions. While these solvents are a promising alternative technology, they are not well-suited for flue gas applications due to their chemistries with respect to water, which typically is a major component of flue gas. $CO_2$ is captured via the formation of amidinium and guanidinium alkyl carbonate salts derived from the conjugate bases of the deprotonated alcohol components. However, the alkyl carbonate esters are typically hydrolyzed in water under basic conditions, resulting in bicarbonate salts.

Accordingly, it would be beneficial to formulate a new solvent system capable of effectively removing acid gases from gas streams (particularly water-containing gas streams) and which can be regenerated at a lower temperature and energy load than the solvents currently utilized for such purposes.

SUMMARY OF THE INVENTION

The present disclosure generally provides solvent systems for the removal of acidic gases, such as $CO_2$, from a gas stream and methods for removing acidic gases using such solvent systems. Various solvent systems are described herein that are capable of functioning in this capacity.

In one aspect is provided a solvent system comprising a solution formed of: an ionic liquid consisting of a nucleophilic amine and a protic, non-aqueous liquid, wherein the ionic liquid reacts with an acidic gas so as to form an ionic solution comprising: 1) a carbamate salt, Zwitterionic sulfamic acid, sulfate salt, or a combination thereof and 2) a protonated weak acid. In certain such solvent systems, the nucleophilic amine is selected from the group consisting of: a primary amine, a secondary amine, a diamine, a triamine, a tetraamine, a pentamine, a cyclic amine, a cyclic diamine, an amine oligomer, a polyamine, an alcoholamine, and mixtures thereof. In certain such solvent systems, the protic non-aqueous liquid is a liquid having a pKa of about 8 to about 15. The protic non-aqueous liquid can be, for example, selected from the group consisting of: a fluorinated alcohol, an optionally substituted phenol; a nitrogen heterocycle, and mixtures thereof. Exemplary protic non-aqueous liquids include, but are not limited to, 2,2,3,3,4,4,5,5-octafluoropentanol; 2,2,3,3-tetrafluoropropanol; 2,2,3,3,3-pentafluoropropanol; 2,2,3,3,4,4-hexafluorobutanol; 2,2,2-trifluoroethanol; nonafluoro-1-hexanol; 4,4,5,5,6,6,7,7,7-nonafluoroheptanol; 1,1,3,3-hexafluoro-2-phenyl-2-propanol; 4-methoxyphenol; 4-ethoxyphenol; 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bis-trifluoromethylpyrazole; 3-trifluoromethylpyrazole, 2-fluorophenol, 3-fluorophenol, 4-fluorophenol, 2-trifluoromethylphenol, 3-trifluoromethylphenol, 4-trifluoromethylphenol, and mixtures thereof.

In another aspect is provided a solvent system comprising a solution formed of:
a mixture of two or more nucleophilic amines and two or more non-aqueous liquids, wherein one or more of the nucleophilic amines have structures such that they react with an acidic gas so as to form one or more of a carbamate salt, a mixed carbamate, salt, a Zwitterionic sulfamic acid, and a sulfate salt. In certain embodiments of such solvent systems, the two or more nucleophilic amines can be alkyl fluoroaromatic amines. For example, the alkyl fluoroaromatic amines can be, for example, selected from the group consisting of 3-fluoro-N-methylbenzylamine, 4-fluoro-N-methylbenzylamine, 2-fluorophenethylamine, 3-fluorophenethylamine, and 4-fluorophenethylamine. The two or more non-aqueous liquids used according to certain embodiments of this solvent system can be, in certain embodiments, selected from the group consisting of 2,2,3,3,4,4,5,5-octafluoropentanol, 3,3,4,4,5,5,6,6-hexafluorobutanol, and 4,4,5,5,6,6,7,7,7-nonafluoroheptanol.

In one aspect is provided a solvent system comprising a solution formed of: a nucleophilic amine; a non-nucleophilic, nitrogenous base; and a non-aqueous liquid, wherein the nucleophilic amine has a structure such that it reacts with an acidic gas so as to form a carbamate salt, a mixed carbamate salt, a sulfamic acid, a sulfamate, or a sulfate salt, and wherein the non-nucleophilic, nitrogenous base and non-aqueous liquid react to form a mixed carbamate salt, a carbonate ester or a heteroatom analogue of a carbonate ester. In certain such solvent systems, the nucleophilic amine is selected from the group consisting of 3-fluoro-N-methylbenzylamine, 4-fluoro-N-methylbenzylamine, 2-fluorophenethylamine, 3-fluorophenethylamine, 4-fluorophenethylamine, and mixtures thereof. In certain such solvent systems, the non-nucleophilic nitrogenous base can be a guanidine or substituted guanidine. The non-aqueous liquid in this type of solvent system can be, for example, a fluorinated alcohol with five or more carbons.

In an additional aspect is provided a solvent system consisting of: a neat nucleophilic amine with a structure such that it reacts with an acidic gas so as to form an amine carbamate salt, Zwitterionic sulfamic acid, sulfate salt, or mixture thereof. In one specific embodiment, the nucleophilic amine in such a solvent system can be 3-fluoro-N-methylbenzylamine.

In a further aspect is provided a solvent system comprising a solution formed of: a mixture of one or more nucleophilic amines and one or more non-nucleophilic, nitrogenous bases with structures such that they react with an acidic gas so as to form carbamates, mixed carbamates, sulfamic acids, sulfate salts, or a mixture thereof. In certain embodiments, such a solvent system can be such that the one or more nucleophilic amines comprise primary or secondary amines and/or the one or more non-nucleophilic, nitrogenous bases comprise tertiary amines, amidines, and/or guanidines (wherein one or more of the primary amines, secondary amines, tertiary amines, guanidines, and/or amidines can optionally be fluorinated). Exemplary primary and secondary amines include, but are not limited to, 3-fluoro-N-methylbenzylamine, 4-fluoro-N-methylbenzylamine, 2-fluorophenethylamine, 3-fluorophenethylamine, and 4-fluorophenethylamine.

The nucleophilic amine component in any of these solvent systems can, in some embodiments, be hydrophobic. Where a non-nucleophilic, nitrogenous base is present, the non-nucleophilic, nitrogenous base can be hydrophobic or substantially immiscible with water. Generally, the solvent systems described herein may, in certain embodiments, be substantially immiscible with water. For example, in some embodiments, the solvent systems may have a solubility with water of less than about 10 g or less than about 20 g of solvent per 100 mL of water. In some embodiments, one or more (including all) components of the solvent systems described herein can be described as hydrophobic, substantially immiscible with water, and/or immiscible with water. The acidic gases that can react with the various solvent systems described herein can vary and may comprise, for example, $CO_2$, $SO_2$, $COS$, $CS_2$, $NON$, or a combination thereof. In certain specific embodiments, the acidic gas comprises $CO_2$ or $SO_2$.

In another aspect of the invention is provided a process for the removal of acid gas from a gas stream, comprising contacting an acid gas-containing gas stream with any of the solvent systems described herein. The gas-containing stream can, in some embodiments, be a mixed gas stream comprising $CO_2$, $SO_2$, $COS$, $CS_2$, $NON$, or a combination thereof. In certain embodiments, the solvent system can tolerate water up to or equal to about 20% water by volume with no degradation of solvent performance. In some embodiments, the acid gas-containing gas stream comprises water and the water can collect as a phase separate from the solvent system.

The process can, in certain embodiments, further comprise withdrawing an acid gas-rich solvent and an acid gas-lean gas stream. In some embodiments, the process can further comprise regenerating the acid gas-rich solvent by applying heat to form a regenerated solvent comprising a lower content of acid gas than present in the acid gas-rich solvent. The heat involved in such a process can, for example, be derived from a source selected from the group consisting of low-pressure steam, hot flue gas, or a combination thereof.

DETAILED DESCRIPTION OF THE INVENTION

Figure 1:
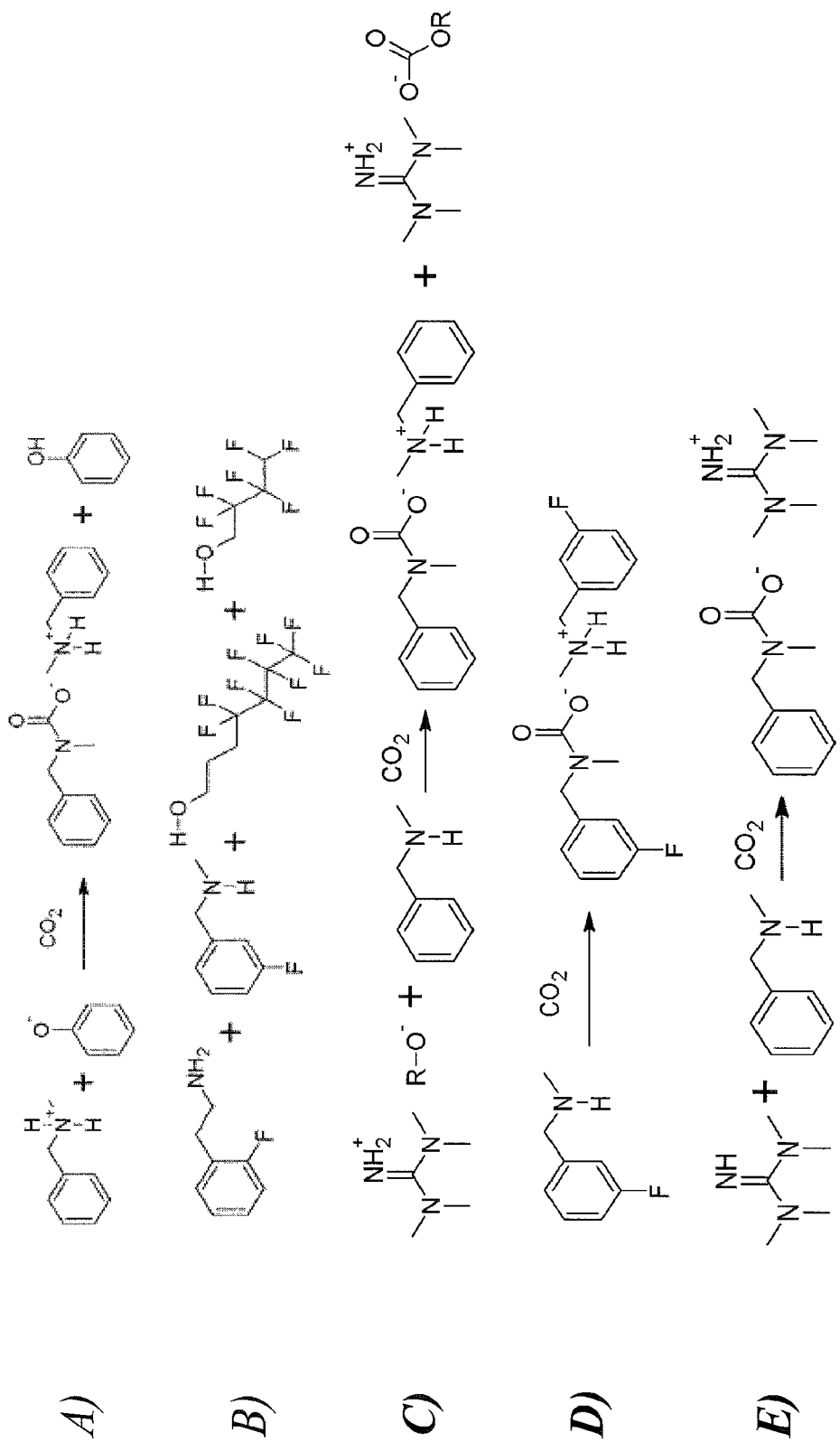
FIG. 1 is a scheme showing various embodiments of solvent systems and reaction pathway employed for capturing $CO_2$.
Figure 2:
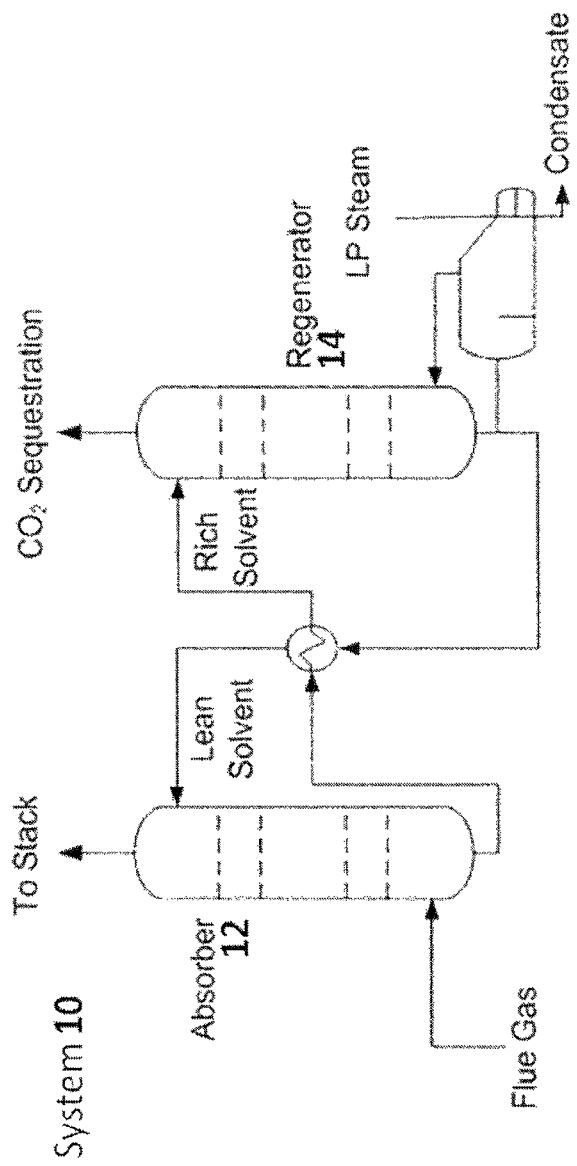
FIG. 2 is a diagram of a reboiler-based system embodied by the present invention for the capture and regeneration of acidic gases from a mixed gas stream.
Figure 3:
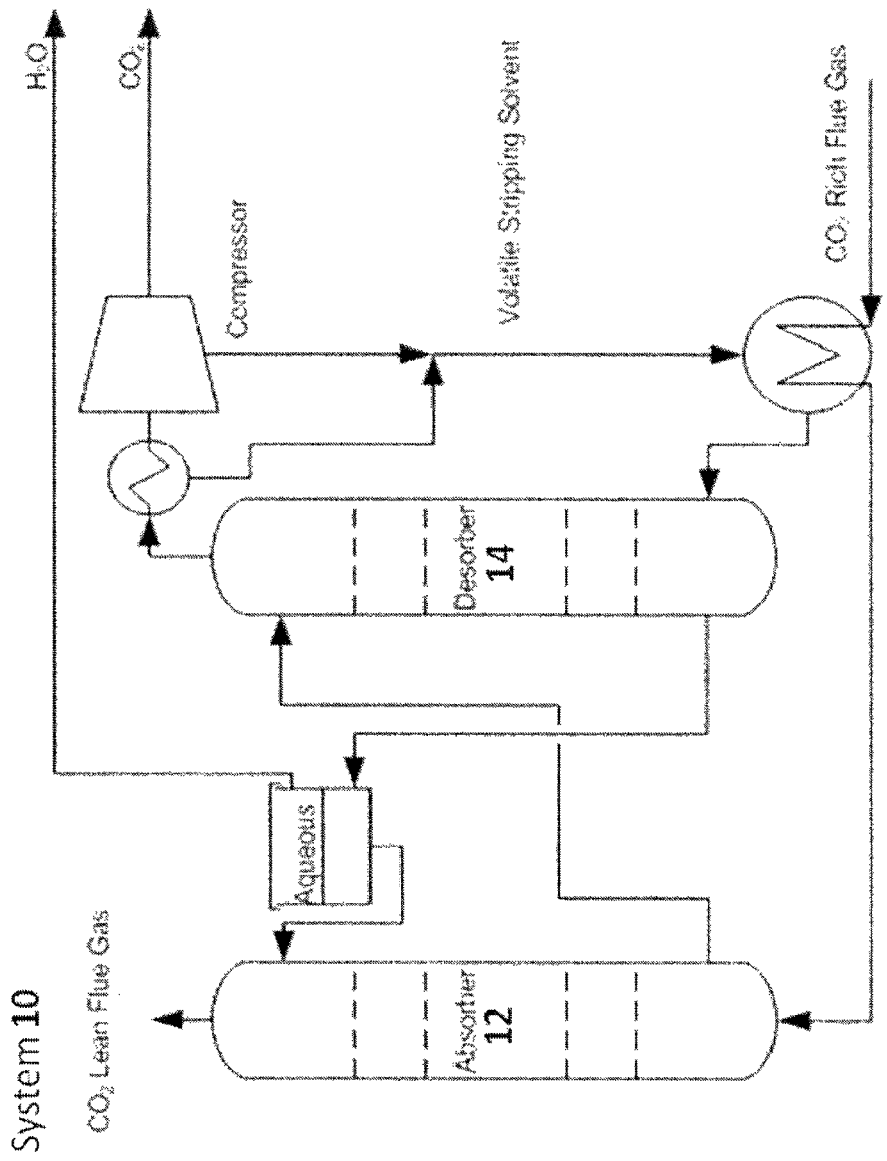
FIG. 3 is a diagram of a reboiler-free system embodied by the present invention for the capture of acidic gases from a mixed gas stream.
Figure 4:
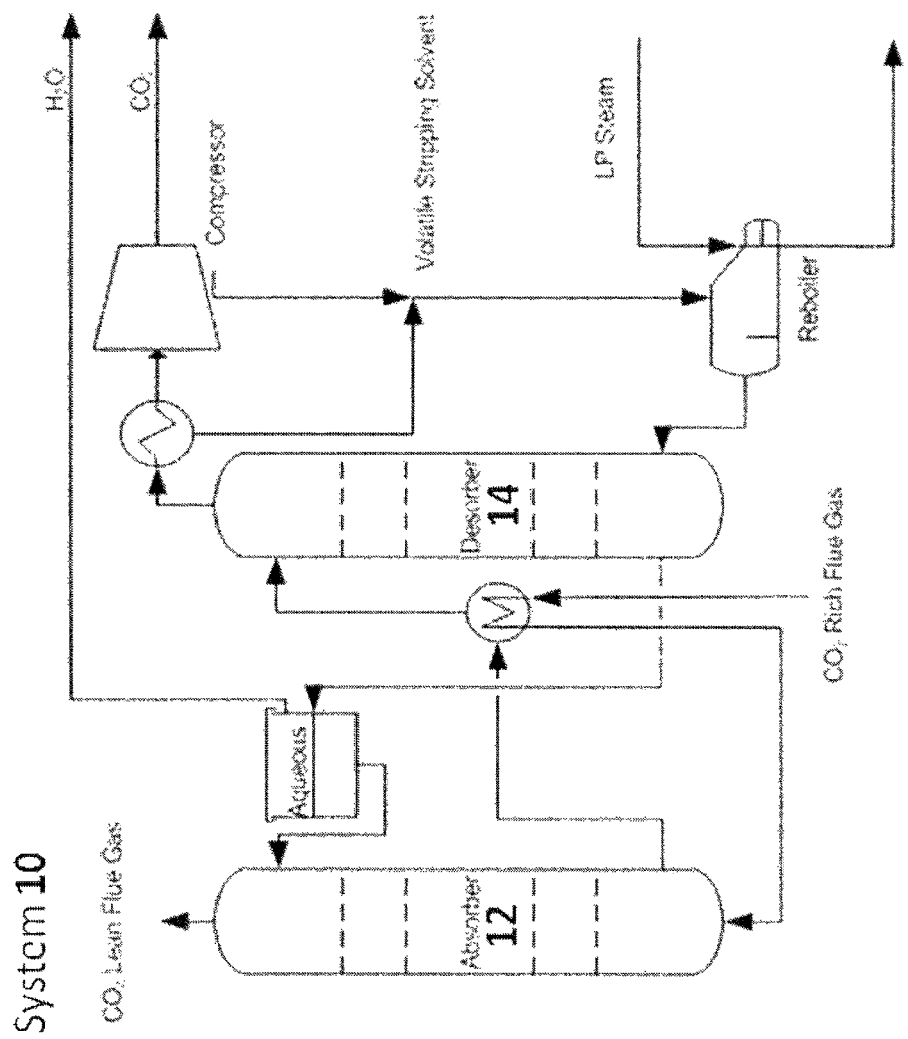
FIG. 4 is a diagram of a reboiler-assisted system embodied by the present invention for the capture of acidic gases from a mixed gas stream.
Figure 5:
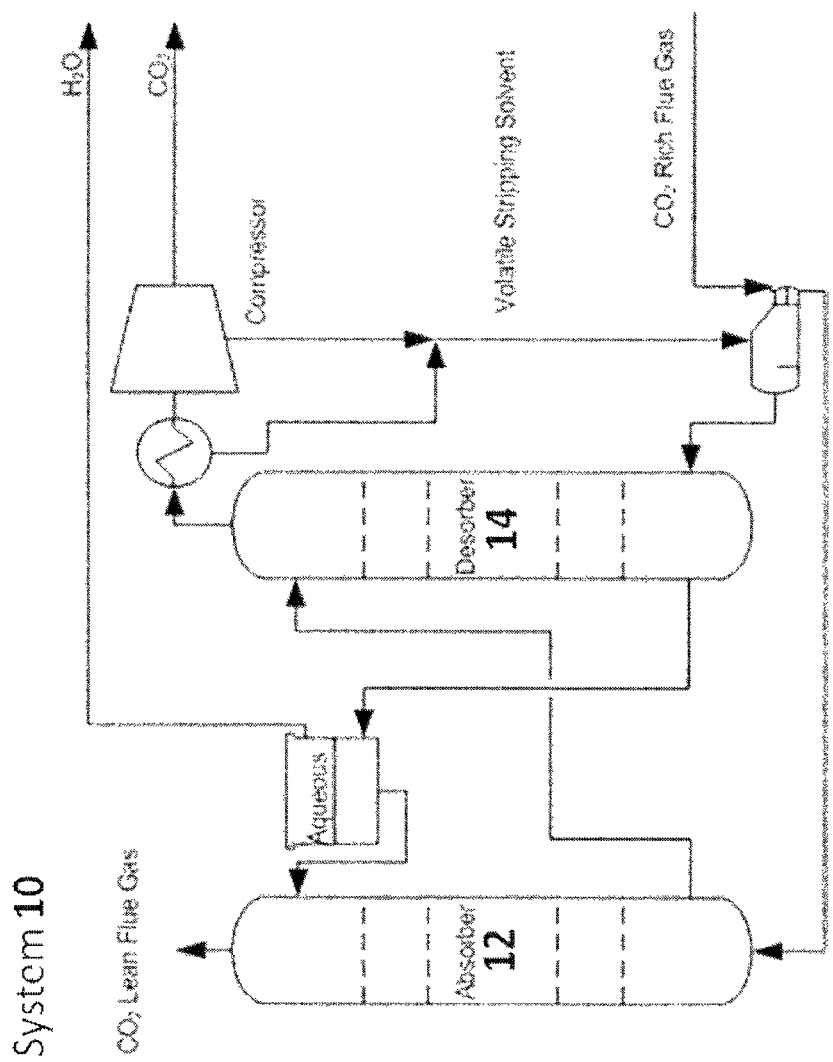
FIG. 5 is a diagram of a waste heat reboiler system embodied by the present invention for the capture of acidic gases from a mixed gas stream.
Figure 6:
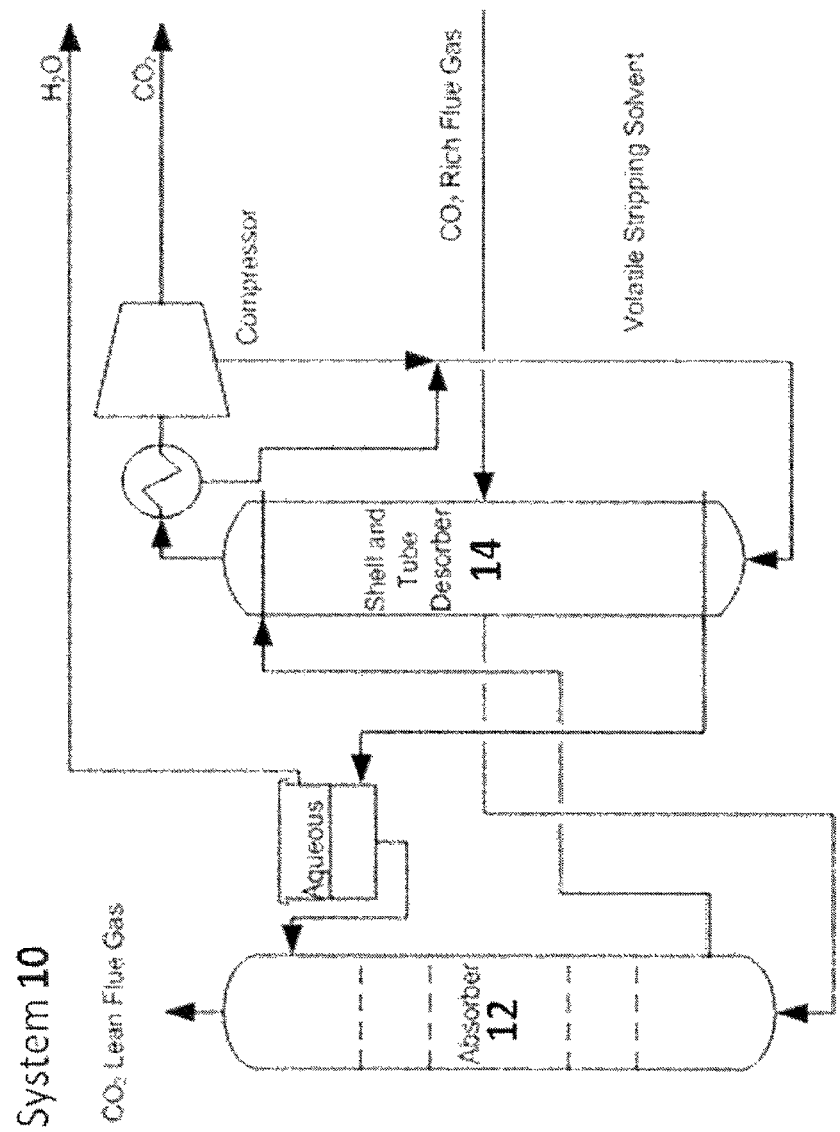
FIG. 6 is a diagram of a waste heat utilization system embodied by the present invention for the capture of acidic gases from a mixed gas stream.

The present invention now will be described more fully hereinafter with reference to the accompanying drawings, in which some, but not all embodiments of the inventions are shown.

Indeed, these inventions may be embodied in many different forms and should not be construed as limited to the embodiments set forth herein; rather, these embodiments are provided so that this disclosure will satisfy applicable legal requirements. Like numbers refer to like elements. As used in this specification and the claims, the singular forms "a," "an," and "the" include plural referents unless the context clearly dictates otherwise.

In one aspect of the present invention is provided a liquid solvent system. The solvent system may be used for the separation of acidic gases from gas mixtures. The term "acid gas" or "acidic gas" is intended to refer to any gas component that can result in formation of an acid when mixed with water. Non-limiting examples of acid gases encompassed by the present invention include $CO_2$, $SO_2$, COS, $CS_2$ and NOx. For simplicity, the invention is described below in relation specifically to $CO_2$ and $SO_2$. It is understood, however, that the present invention encompasses methods and systems for removal of any acid gas component from a gas stream. In certain embodiments, the solvent system is regenerable in that the acidic gases can be released from the solvent, and the solvent can be reused to separate additional acidic gases from further gas mixtures. In particular embodiments, the solvent system is regenerable at temperatures lower than those typically required for solvents used for such purposes.

Generally, the solvent systems described herein comprise some combination of one or more of the following classes of reagents: nitrogenous bases (including nucleophilic amines and non-nucleophilic nitrogenous bases); non-aqueous liquids; protic, non-aqueous liquids; diluents; and/or ionic liquids. In certain aspects, the solvent systems of the invention comprise a mixture of components from two or more of these classes. In certain aspects, the solvent systems of the invention consist of one or more components from a single class of these reagents. These classes of reagents are described generally herein. The various types of solvent systems intended to be encompassed by the present invention and particularly preferred reagents for each will be separately described below.

Generally, nitrogenous base components include nucleophilic amines and non-nucleophilic nitrogenous bases. A nitrogenous base component (i.e., a nucleophilic amine and/or non-nucleophilic nitrogenous base), is a nitrogenous base that reacts according to one or more of the mechanisms provided herein. For example, the nitrogenous base may react with $CO_2$ and/or with other components of the solvent system according to one of the embodiments provided herein. In some embodiments, the nitrogenous base component(s) (which may be a nucleophilic amine and/or non-nucleophilic nitrogenous base) can have a pKa of about 8 to about 15, about 8 to about 14, about 8 to about 13, about 8 to about 12, about 8 to about 11, or about 8 to about 10. In certain embodiments, the nitrogenous base component has a pKa less than about 11. In other embodiments, the nitrogenous base can have a pKa of between about 12 and about 15, about 12 to about 14, or about 13 to about 15, such as about 12, about 13, about 14, or about 15.

In the solvent systems described herein, the nitrogenous base component (or components) of the solvent systems, where present, is advantageously selected such that it has low miscibility with water. In preferred embodiments, the nitrogenous base has higher miscibility with the optional one or more other components of the solvent system than with water. In some embodiments, the nitrogenous base component or components have high solubility in the optional one or more other components of the solvent system.

A nucleophilic amine is an amine having a reactive nitrogen center which bonds with non-hydrogen nuclei under relevant process time-scales and typical process conditions relevant to the gas mixture subjected to treatment therewith. Nucleophilic amines include, but are not limited to, primary amines, secondary amines, diamines, triamines, tetraamines, pentamines, cyclic amines, cyclic diamines, amine oligomers, polyamines, alcoholamines, and the like.

A non-nucleophilic nitrogenous base is a nitrogenous base (including but not limited to, an amine) that acts as a Bronsted base, forming bonds with one or more hydrogen nuclei (protons) under relevant process time-scale and typical process conditions relevant to the gas mixture subjected to treatment therewith to give a positively charged nitrogen center. Non-nucleophilic nitrogenous bases include tertiary amines, guanidines, and amidines and/or analogues thereof.

In certain specific embodiments, various exemplary nitrogenous bases useful as solvent system components may be selected from the group consisting of 1,4-diazabicycloundec-7-ene ("DBU"); 1,4-diazabicyclo-2,2,2-octane; piperazine ("PZ"); triethylamine ("TEA"); 1,1,3,3-tetramethylguanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethylamine; 3,5-difluorobenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; and mixtures thereof. Still other nitrogenous bases that may be used according to the present invention include, for example, those disclosed in U.S. Patent Application Publication No. 2008/0058549 to Jessop et al., the disclosure of which is incorporated herein by reference.

A non-aqueous liquid is understood to be a liquid other than water. In certain situations, the non-aqueous liquid is a protic non-aqueous liquid, which is a liquid with an ionizable hydrogen which readily dissociates in the presence of a non-nucleophilic amine. As such, in some embodiments, the non-aqueous liquid (e.g., protic non-aqueous liquid) is a "relatively acidic component," understood to mean a material having an acidity that is greater than the acidity of water, preferably substantially greater than the acidity of water. For example, in some embodiments, a non-aqueous liquid (e.g., a protic non-aqueous liquid) that is a relatively acidic component can have a pKa of less than about 15, less than about 14, less than about 13, less than about 12, less than about 11, or less than about 10. In some embodiments, the relatively acidic component has a pKa of about 8 to about 15, 9 to about 15, about 10 to about 15, about 11 to about 15, about 12 to about 15, about 13 to about 15, about 8 to about 14, about 8 to about 13, about 8 to about 12, or about 8 to about 11, about 9 to about 14, about 9 to about 13, about 9 to about 12, about 9 to about 11, about 10 to about 12, about 10 to about 13, about 10 to about 14, about 11 to about 13, or about 11 to about 14. Exemplary classes of relatively acidic components that may be used (as non-aqueous liquids or protic non-aqueous liquids) according to certain embodiments of the invention include, but are not limited to the following: fluorinated alcohols; optionally substituted phenols; and nitrogen heterocycles (e.g., pyrazoles and imidazoles). Particularly preferred are relatively acidic components selected from fluorinated alcohols and optionally substituted phenols.

In some embodiments, the solvent systems comprise one or more diluents. A diluent is understood to be a solvent component that does not participate in reaction with the other components in the solvent system to any significant extent. The types of substances that can serve as diluents in such embodiments include certain non-aqueous liquids (including protic, non-aqueous liquids), as described above. Whether a non-aqueous liquid (including a protic, non-aqueous liquid) can serve as a diluent depends upon the additional component(s) of the solvent system wherein it is used. Non-aqueous liquids (including protic, non-aqueous liquids) are considered to be reactive components of the solvent systems described herein unless otherwise stated. Diluents may, in some embodiments, be relatively acidic components. Exemplary classes of relatively acidic components that may be used as diluents according to certain embodiments of the invention include, but are not limited to the following: fluorinated alcohols; optionally substituted phenols; and nitrogen heterocycles (e.g., pyrazoles and imidazoles).

In some embodiments, a diluent can have a pKa of less than about 15, less than about 14, less than about 13, less than about 12, less than about 11, or less than about 10. In some embodiments, the diluent has a pKa of the alcohol component is about 6 to about 15, about 7 to about 15, about 8 to about 15, about 9 to about 15, about 6 to about 14, about 7 to about 14, about 8 to about 13, about 9 to about 13, about 6 to about 12, about 7 to about 12, about 8 to about 12, about 9 to about 12, about 6 to about 11, about 7 to about 11, about 8 to about 11, about 9 to about 11, about 6 to about 10, about 7 to about 10, or about 8 to about 10. In other embodiments, a non-aqueous liquid acting as a diluent is not a relatively acidic component, and does not have a pKa that falls within the ranges noted above. For example, the diluent may, in certain embodiments, have a pKa greater than about 15.

In some embodiments, the diluent is preferably a non-aqueous diluent. In certain embodiments, the diluent is selected such that it has low miscibility with water. For example, in some embodiments, the diluent has a solubility of less than or equal to about 10 g/100 mL in water at 25° C. (i.e., 10 g of solvent per 100 mL of water) or about 20 g/100 mL in water at 25° C. In other embodiments, the diluent has a solubility in water of less than or equal to about 0.01 g/100 mL, less than or equal to about 0.1 g/100 mL, less than or equal to about 0.5 g/100 mL, less than or equal to about 1 g/100 mL, less than or equal to about 1.5 g/100 mL, less than or equal to about 2 g/100 mL, less than or equal to about 2.5 g/100 mL, less than or equal to about 3 g/100 mL, less than or equal to about 4 g/100 mL, less than or equal to about 5 g/100 mL, less than or equal to about 6 g/100 mL, less than or equal to about 7 g/100 mL, less than or equal to about 8 g/100 mL, or less than or equal to about 9 g/100 mL in water at 25° C. In some embodiments, the diluent is completely immiscible with water. Using diluents with low water solubility may result in solvent systems that display one or more of the following attributes: they may require less energy for regeneration; may have high $CO_2$ loading capacities; may be able to tolerate water in the gas stream; and/or may be able to be separated from water without a large energy penalty.

Certain specific solvent systems are illustrated in FIG. 1 of the present application and are described further below. Additional discussion of solvent components that can be used in certain solvent systems of the present disclosure is provided, for example, in International Application No. PCT/US2011/050442 to Lail et al., filed Sep. 2, 2011 and PCT/US2011/050452 to Lail et al., filed Sep. 3, 2011, which are incorporated herein by reference. In some embodiments, the solvent systems described herein are substantially immiscible with water, having a solubility at 25° C. of less than or equal to about 10 g of solvent per 100 mL of water, less than or equal to about 20 g of solvent/100 mL of water, less than or equal to about 9 g of solvent/100 mL of water, less than or equal to about 8 g of solvent/100 mL of water, less than or equal to about 7 g of solvent/100 mL of water, less than or equal to about 6 g of solvent/100 mL of water, less than or equal to about 5 g of solvent/100 mL of water, less than or equal to about 4 g of solvent/100 mL of water, less than or equal to about 3 g of solvent/100 mL of water, less than or equal to about 2 g of solvent/100 mL of water, less than or equal to about 1 g of solvent/100 mL of water, less than or equal to about 0.5 g of solvent/100 mL of water, less than or equal to about 0.1 g/100 mL of water, or less than or equal to about 0.01 g/100 mL of water. In some embodiments, the solvent system is completely immiscible with water. Solvent systems with low water miscibility may, in some embodiments, display one or more of the following attributes: they may require less energy for regeneration; may have high $CO_2$ loading capacities; may be able to tolerate water in the gas stream; and/or may be able to be separated from water without a large energy penalty. It is noted that although solvent system components having low miscibility with water are preferred, the present invention also encompasses solvent systems wherein one or more of the components of the solvent system are at least partially miscible with water.

The solvent systems described herein may, as noted above, be used for the removal of one or more acidic gases from a gas stream. In some embodiments, the solvent systems of the present disclosure may be particularly useful for capturing $CO_2$ from a gas stream. The gas stream may be a mixed gas stream, having one or more other components in addition to $CO_2$. When a solution comprising a solvent system of the present invention is purged with a gas mixture containing $CO_2$, one or more components of the solvent system undergo a chemical reaction with $CO_2$, binding the $CO_2$ in the solution. In some embodiments, the solvent systems of the present invention have high $CO_2$ loadings. For example, the solvent systems may be useful for capturing or removing greater than about 0.05 moles $CO_2$ per mole of nitrogenous base, greater than about 0.1 moles $CO_2$ per mole of nitrogenous base, greater than about 0.2 moles $CO_2$ per mole of nitrogenous base, greater than about 0.3 moles $CO_2$ per mole of nitrogenous base, greater than about 0.4 moles $CO_2$ per mole of nitrogenous base, greater than about 0.5 moles $CO_2$ per mole of nitrogenous base, greater than about 0.6 moles $CO_2$ per mole of nitrogenous base, greater than about 0.7 moles $CO_2$ per mole of nitrogenous base, greater than about 0.8 moles $CO_2$ per mole of nitrogenous base, greater than about 0.9 moles $CO_2$ per mole of nitrogenous base, or greater than about 1 mole $CO_2$ per mole of nitrogenous base.

In some embodiments, any of the solvent systems described herein is tolerant to the presence of water. In certain embodiments, the solvent system tolerates water up to or equal to about 30% water by volume. For example, in some embodiments, the solvent system tolerates up to or equal to about 25% water by volume, up to or equal to about 20%, up to or equal to about 15%, up to or equal to about 10%, up to or equal to about 5%, up to or equal to about 2%, or up to or equal to about 1% water by volume. In some embodiments, tolerance to the presence of water means that there is little to no degradation of the solvent performance up to the indicated volume of water. In some embodiments, the solvent system maintains at or near its initial capacity for $CO_2$ loading up to the indicated volume of water.

In some embodiments, the solvent system may further comprise one or more additional components. The additional components may be added, for example, to increase the solubility of the captured $CO_2$ product in the solvent system, and thus avoid the formation of precipitates. In other embodiments, however, solids formation may be desirable, and such formation may be enhanced by altering the concentration of one or more solvent system components.

In preferred embodiments, the $CO_2$ captured using the solvent system of the present invention may be released to regenerate the solvent system for reuse. It is preferred that the solvent system is regenerable (or reaction with the $CO_2$ is reversible) under mild conditions (e.g., at a low temperature). In some embodiments, the release of $CO_2$ and corresponding regeneration of the solvent system is effectuated by heating the solution. When the solution containing bound $CO_2$ is heated, the chemical reaction is reversed and the $CO_2$ is released, producing a concentrated $CO_2$ stream.

In some embodiments, the present application relates to a solvent system and process for the removal of $CO_2$ from a gas stream. The present invention applies to any gas stream containing $CO_2$. For example, in particular embodiments, the invention relates to a process for the removal of $CO_2$ from fossil fuel combustion flue gas, a natural gas mixture, or a mixture of respiration gases from closed environments containing $CO_2$. The process involves passing the mixed gas stream through one of the solvent systems described herein. In some embodiments, the present invention further relates to the regeneration of the solvent system, which releases the $CO_2$. Several techniques can be employed to regenerate the solvent. These include, but are not limited to, thermal swing, partial pressure swing, by flashing, stripping, applying a vacuum, or combinations of, pH swing, or combinations of. In some embodiments, regeneration of the solvent system involves heating the solvent system at a temperature sufficient to release the $CO_2$. In some embodiments, the process involves heating the solvent system at a temperature at or below about 200° C., for example, at or below about 185° C., at or below about 150° C., or at or below about 125° C. In preferred embodiments, the process involves heating the solvent system at a temperature at or below about 100° C., for example, at a temperature at or below about 95° C., at or below about 90° C., at or below about 85° C., at or below about 80° C., at or below about 75° C., or at or below about 70° C. In some embodiments, the $CO_2$ may be released at ambient temperature. In certain embodiments, the $CO_2$ is captured in a non-aqueous phase under conditions in which water accumulates as a separate, lower density phase. This phase can be sent to the regenerator with the rich, non-aqueous phase to be regenerated at a lower temperature than the corresponding rich aqueous phase alone. This can be followed by phase separation from the lean, regenerated solvent before being sent back to the absorber.

In certain embodiments, at or about 100% of the $CO_2$ is removed from the $CO_2$-rich solvent system. However, in other embodiments, less than 100% of the $CO_2$ is removed from the $CO_2$-rich solvent system. In preferred embodiments, about 50 to 100% of the captured $CO_2$ is removed from the $CO_2$-rich solvent system, preferably about 75% to 100%, about 80% to 100%, about 90% to 100%, about 95% to about 100%, or about 98% to 100%. For example, in some embodiments, at least about 98%, 95%, 90%, 85%, 80%, 75%, 70%, 60%, or 50% of the captured $CO_2$ is removed from the $CO_2$-rich solvent system.

In some embodiments, the removal of $CO_2$ from gas mixtures containing $H_2O$ in addition to $CO_2$ can lead to the accumulation of $H_2O$ in the solvent system, either as a single phase or biphase solution, depending upon the reaction conditions. As noted above, the presence of $H_2O$ in the solvent mixture may be disadvantageous because of an undesirable side reaction, and more energy will be required for solvent regeneration due to the necessity of removing water from the solvent. Thus, the accumulation of $H_2O$ in the solvent system may increase the regeneration energy demand, decreasing the efficiency of the regeneration system.

In some embodiments, the process of the present invention provides a method by which the detrimental effects of $H_2O$ accumulation in the solvent system may be avoided. For example, the detrimental effect of $H_2O$ accumulation on the solvent system regeneration energy demand may be minimized, by providing a process by which the $CO_2$ is captured within the solvent system at a temperature greater than the $H_2O$ saturation temperature of the gas mixture. Additionally, in certain embodiments, the detrimental effect of $H_2O$ accumulation on the solvent system regeneration energy demand may be minimized by providing a process by which the $H_2O$ accumulates as a separate, aqueous phase within the solvent system. This process involves the use of a solvent system that exhibits little or no solubility in water. In such a system, water that collects is present as a separate phase. The separate, aqueous phase may be decanted or centrifuged off by mechanical, rather than thermal, processes, minimizing the energy required to maintain an efficient $CO_2$ removal system. For example, as the hydrocarbon chain of aliphatic alcohols is increased in length, the solubility of the alcohol in water decreases. This is also true for fluorinated alcohols. For example, 2,2,3,3,4,4,5,5-octafluoropentanol ("OFP") is substantially immiscible with water. Thus, certain solvent systems described herein comprising appropriate components may form a biphasic liquid solution when combined with water. In such solvent systems, water can be separated from the solvent system without distillation or the use of a membrane by decanting or centrifugation of the aqueous layer from the fluorinated phase. In some embodiments, after removal of the $H_2O$, the $CO_2$-rich solvent system can be regenerated at a low temperature with the addition of low boiling diluents to satisfy the partial pressure requirements. The solvent system could thus avoid the added energy penalty associated with the distillation of water. By providing a non-aqueous $CO_2$ absorbing solvent system with low water solubility, the solvent system has lower energy demands and milder regeneration conditions than those of aqueous or high-water affinity $CO_2$ solvent systems.

In some embodiments, a system for the removal of $CO_2$ from a gas stream is provided. A schematic of an exemplary system of the present invention is depicted in FIGS. 2 through 6. The $CO_2$ removal system 10 includes an absorber 12 configured with an inlet to receive a gas stream. The gas stream may come directly from, e.g., a combustion chamber of a boiler system in a power generation plant. The gas stream may or may not be passed through other cleaning systems prior to entering the $CO_2$ removal system. The absorber may be any chamber wherein a solvent system for the removal of $CO_2$ is contained, having an inlet and outlet for a gas stream, and wherein the gas stream may be brought into contact with the solvent system. Within the absorber, the $CO_2$ may be transferred from gaseous phase to liquid phase according to the principles discussed herein. The absorber may be of any type; for example, the absorber may comprise a spray-tower absorber, packed-bed absorber (including countercurrent-flow tower or cross-flow tower), tray-tower absorber (having various tray types, including bubble-cap trays, sieve trays, impingement trays, and/or float valve trays), venture absorber, or ejector absorber. The temperature and pressure within the absorber may be controlled. For example, in one embodiment, the temperature of the absorber may be maintained at or near 50-60° C. and the absorber may be maintained at or near atmospheric pressure. Thus, the absorber may be equipped with a heating/cooling system and/or pressure/vacuum system.

Within the absorber, the gas stream is brought into fluid contact with and passed through a solvent system as described herein. The solvent system reacts with the $CO_2$ present in the gas stream, capturing it from the remaining components of the gas, and the resulting $CO_2$-free gas stream is released from the absorber through an outlet. The solvent system continues to react with entering $CO_2$ as the mixed gas stream is passed through, until it becomes "rich" with $CO_2$. The absorber is optionally connected to one or more components. For example, the absorber is preferably configured with a means for routing solvent to a unit wherein water may be decanted, centrifuged, or otherwise removed from the system.

At any stage in the process of $CO_2$ capture, the solvent system may be regenerated. The system therefore includes an optional regeneration system 14 to release the captured $CO_2$ via a separate $CO_2$ gas stream and thus regenerate the solvent system. The regeneration system is configured to receive a feed of "rich" solvent from absorber and to return regenerated solvent to the absorber once $CO_2$ has been separated from the "rich" solvent. The regeneration system may simply comprise a chamber with a heating unit to heat the solvent system at a temperature sufficient to release the gas, along with a release valve to allow the $CO_2$ to be removed from the regeneration system. It may also be a distillation column and have essentially the same design as described above for the absorption column. The regenerator may be optionally connected to one or more components. For example, the regenerator is preferably configured with a means for routing solvent to a unit wherein water may be decanted, centrifuged, or otherwise removed from the system.

The released $CO_2$ can be separated/withdrawn from the system and output to storage or for other predetermined uses. The regenerated solvent system is again ready to absorb $CO_2$ from a gas stream, and may be directed back into the absorber.

I. Ionic Liquids Comprising a Nucleophilic Amine and a Protic, Non-Aqueous Liquid In one aspect of the present disclosure, a solvent system comprising an ionic liquid is provided, wherein the ionic liquid is prepared by combining one or more nucleophilic amines and one or more protic non-aqueous liquids. An ionic liquid solvent system as described in this section is a system wherein ions (cations and anions) are present in solution. The components generally have appropriate pKa values so as to form an ionic liquid in which the nucleophilic amine is the cation. In certain embodiments, a solvent system comprising an ionic liquid at ambient temperature (e.g., between about 20° C. and about 25° C.) is provided. Advantageously, ionic liquid solvent systems as described in this section can react with an acidic gas so as to form an ionic solution comprising: 1) a carbamate salt, Zwitterionic sulfamic acid, sulfate salt, or a combination thereof; and 2) a protonated, weak acid.

Nucleophilic amines that can be used to form certain exemplary ionic liquid solvent systems of this type can be primary and/or secondary amines which have reactive nitrogen centers. A primary amine is understood to be a compound of the formula $NH_2R$, where R can be a carbon-containing group, including but not limited to $C_1$-$C_{20}$ alkyl. A secondary amine is understood to be a compound of the formula $NHR_1R_2$, wherein $R_1$ and $R_2$ are independently carbon-containing groups, including but not limited to $C_1$-$C_{20}$ alkyl. One or more of the hydrogens on R, $R_1$, and $R_2$ may optionally be replaced with one or more substituents. For example, one or more of the hydrogens on R, $R_1$, or $R_2$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

In certain embodiments, primary or secondary amines may be selected from amines functionalized with fluorine-containing-alkyl-aromatic groups. In specific embodiments, the amine may be selected from the group consisting of 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 2-fluorobenzylamine, 3-fluorobenzylamine, 4-fluorobenzylamine, 4,4,5,5,6,6,7,7,8,8,9,9,10,10,11,11,11-heptadecafluoroundecylamine, 2,3-difluorobenzylamine, 2,4-difluorobenzylamine, 2,6-difluorobenzylamine, 3,4-difluorobenzylamine 3,5-difluorobenzylamine, 2-trifluormethylbenzylamine, 3-trifluormethylbenzylamine, 4-trifluormethylbenzylamine, D-4-fluoro-alpha-methylbenzylamine, and L-4-fluoro-alpha-methylbenzylamine.

In some embodiments, the nucleophilic amines that can be used in such solvent systems can comprise cyclic amines, diamines, primary and/or secondary alcoholamines. Cyclic amines are amines wherein the nitrogen atom forms part of the ring structure, and may include, but are not limited to, aziridines, azetidines, pyrrolidines, piperidines, piperazines, pyridines, and pyrimidines. Cyclic amines may comprise one or more rings and may optionally be substituted with one or more substituents as listed above. In some embodiments, the nitrogenous base may be a diamine. In some embodiments, the nitrogenous base may be a primary or secondary alcoholamine. Alcoholamines are also known as amino alcohols and contain both an alcohol and amine group. The amine group of the alcoholamine may be any type of amine as disclosed herein. The nucleophilic amine component is advantageously, in some embodiments, hydrophobic.

Protic non-aqueous liquids that may be utilized to form such ionic liquid solvent systems include, for example, fluorinated alcohols; optionally substituted phenols; and nitrogen heterocycles. Certain protic non-aqueous liquids are fluorinated alcohols (e.g., a fluorinated alcohol with five or more carbons, preferably with low water content (e.g., <about 10 wt % water)). Fluorinated alcohols useful according to the present disclosure may comprise any compound having the formula R—OH, where R is an alkyl group (e.g., $C_1$-$C_{10}$ alkyl, $C_1$-$C_8$ alkyl, $C_1$-$C_6$ alkyl, $C_2$-$C_{10}$ alkyl, $C_2$-$C_8$ alkyl, $C_2$-$C_6$ alkyl, $C_3$-$C_{10}$ alkyl, $C_3$-$C_6$ alkyl, or $C_3$-$C_6$ alkyl) and wherein one or more hydrogen atoms of the alkyl group is substituted with fluorine. In some embodiments, the number of hydrogen atoms replaced with fluorine can be two, three, four, five, six, seven, eight, nine, or even more as may be deemed useful. In further embodiments, one or more of the hydrogen atoms of the alkyl group may optionally be replaced with one or more other substituents, including, but not limited to, $C_1$-$C_6$ alkyl, $C_1$-$C_6$ alkoxy, and halo substituents.

Optionally substituted phenols useful in the invention are understood to mean phenols wherein one or more of the hydrogen atoms on the phenyl ring may be replaced with a substituent. Non-limiting, exemplary replacement groups for one or more of the hydrogen atoms on the phenyl ring include $C_1$-$C_6$ alkyl, $C_1$-$C_6$ alkoxy, and halo. Nitrogen heterocycles are understood to mean any cyclic compound including at least one nitrogen atom in the ring structure (including but not limited to imidazoles, pyrazoles, and triazoles) and being optionally substituted such that one or more of the hydrogen atoms on the ring structure may be replaced with a substituent. In certain embodiments, at least one nitrogen atom in the ring structure has an acidic hydrogen atom with a pKa lower than about 15 (e.g., between about 8 and about 15). Non-limiting, exemplary replacement groups for one or more of the hydrogen atoms on the ring include $C_1$-$C_6$ alkyl, $C_1$-$C_6$ alkoxy, and halo.

In some specific embodiments, the protic non-aqueous liquid can be a relatively acidic component selected from the group consisting of: 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole, 2-fluorophenol, 3-fluorophenol, 4-fluorophenol, 2-trifluoromethylphenol, 3-trifluoromethylphenol, 4-trifluoromethylphenol, and mixtures thereof. Advantageously, protic non-aqueous liquids used within the solvent systems described herein can have low water content (e.g., <about 10 wt % water) and/or low water solubility. Typically, the protic, non-aqueous liquids used in this type of solvent system are active components of the solvent system (i.e., not serving only as diluents).

In ionic liquid solvent systems as described herein, the hydrogen nuclei of the protic non-aqueous liquid is sufficiently ionizable to dissociate from the protic non-aqueous liquid and react with the nucleophilic base. Acid gas components, such as $CO_2$ and $SO_2$, can be absorbed in such an ionic liquid solvent by reversible formation of the protic solvent and formation of a bond between the nucleophilic amine nitrogen and non-hydrogen, acid-gas nuclei forming for example, amine carbamate salts, Zwitterions (e.g., Zwitterionic sulfamic acid), sulfamic acids/salts, or a combination thereof. One exemplary solvent system and mechanism of reaction is shown in FIG. 1A).

In this type of solvent system, the absorption of the acid gas component is advantageously reversible. Upon loss of the acid gas component, the protic solvent again can donate a proton to the nucleophilic base. This solvent system has the advantage of minimizing losses of the nucleophilic amine to vapors due to the low vapor pressure of the ionic liquid salt in an absorption column, for instance, and the low vapor pressure of the carbamate salt in a regenerator section, for instance.

II. Mixtures Containing Two or More Nucleophilic Amines and Two or More Non-Aqueous Liquids In another aspect, a solvent system comprising two or more nucleophilic amines mixed together with two or more non-aqueous liquids over a wide range of component ratios is provided and can be used to separate acid gas components from a gas mixture. The two or more nucleophilic amines react with the acid gas components (e.g., $CO_2$ or $SO_2$) to form at least one bond to nitrogen involving a nucleus other than hydrogen. The product formed with $CO_2$ is a carbamate salt and can consist of a single amine carbamate structure or of a mixed amine carbamate structure. In certain embodiments, the solvent system removes $CO_2$ without any substantial formation of a carbonate ester or a heteroatom analogue of a carbonate ester.

Nucleophilic amines that can be used to form certain exemplary solvent systems of this type can be primary and/or secondary amines which have reactive nitrogen centers. A primary amine is understood to be a compound of the formula $NH_2R$, where R can be a carbon-containing group, including but not limited to $C_1$-$C_{20}$ alkyl. A secondary amine is understood to be a compound of the formula $NHR_1R_2$, wherein $R_1$ and $R_2$ are independently carbon-containing groups, including but not limited to $C_1$-$C_{20}$ alkyl. One or more of the hydrogens on R, $R_1$, and $R_2$ may optionally be replaced with one or more substituents. For example, one or more of the hydrogens on R, $R_1$, or $R_2$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

In certain embodiments, primary or secondary amines may be selected from amines functionalized with fluorine-containing-alkyl-aromatic groups. In specific embodiments, the amine may be selected from the group consisting of 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 2-fluorobenzylamine, 3-fluorobenzylamine, 4-fluorobenzylamine, 4,4,5,5,6,6,7,7,8,8,9,9,10,10,11,11,11-heptadecafluoroundecylamine, 2,3-difluorobenzylamine, 2,4-difluorobenzylamine, 2,6-difluorobenzylamine, 3,4-difluorobenzylamine 3,5-difluorobenzylamine, 2-trifluormethylbenzylamine, 3-trifluormethylbenzylamine, 4-trifluormethylbenzylamine, D-4-fluoro-alpha-methylbenzylamine, and L-4-fluoro-alpha-methylbenzylamine.

In some embodiments, the nucleophilic amines that can be used in such solvent systems can comprise cyclic amines, diamines, primary and/or secondary alcoholamines. Cyclic amines are amines wherein the nitrogen atom forms part of the ring structure, and may include, but are not limited to, aziridines, azetidines, pyrrolidines, piperidines, piperazines, pyridines, and pyrimidines. Cyclic amines may comprise one or more rings and may optionally be substituted with one or more substituents as listed above. In some embodiments, the nucleophilic amine may be a diamine. In some embodiments, the nucleophilic amine may be a primary or secondary alcoholamine. Alcoholamines are also known as amino alcohols and contain both an alcohol and amine group. The amine group of the alcoholamine may be any type of amine as disclosed herein.

Preferably, one or both of the nucleophilic amines are non-aqueous and/or are hydrophobic and can advantageously have low water solubility (e.g., <about 10 wt %). Certain exemplary nucleophilic amines useful in this type of solvent system include, but are not limited to, alkyl fluoro-aromatic amines such as 3-fluoro-N-methylbenzylamine, 4-fluoro-N-methylbenzylamine, 2-fluorophenethylamine, 3-fluorophenethylamine, and 4-fluorophenethylamine.

Non-aqueous liquids useful according to this type of solvent system can vary. It is noted that one or more such non-aqueous liquids may, in some embodiments, be a protic, non-aqueous liquid. Preferably, one or both of the non-aqueous liquids have low water solubility (e.g., <about 10 wt %) and/or are hydrophobic. In certain embodiments, such non-aqueous liquids comprise fluorinated alcohols. Fluorinated alcohols useful according to the invention may comprise any compound having the formula R—OH, where R is an alkyl group (e.g., $C_1$-$C_{10}$ alkyl, $C_1$-$C_8$ alkyl, $C_1$-$C_6$ alkyl, $C_2$-$C_{10}$ alkyl, $C_2$-$C_8$ alkyl, $C_2$-$C_6$ alkyl, $C_3$-$C_{10}$ alkyl, $C_3$-$C_8$ alkyl, or $C_3$-$C_6$ alkyl) and wherein one or more hydrogen atoms of the alkyl group is substituted with fluorine. In some embodiments, the number of hydrogen atoms replaced with fluorine can be two, three, four, five, six, seven, eight, nine, or even more as may be deemed useful. In further embodiments, one or more of the hydrogen atoms of the alkyl group may optionally be replaced with one or more other substituents, including, but not limited to, $C_1$-$C_6$ alkyl, $C_1$-$C_6$ alkoxy, and halo substituents. Certain exemplary non-aqueous liquids include, but are not limited to, 2,2,3,3,4,4,5,5-octafluoropentanol, 3,3,4,4,5,5,6,6-hexafluorobutanol, and 4,4,5,5,6,6,7,7,7-nonafluoroheptanol. In specific embodiments, one or more of the non-aqueous liquids may be selected from the group consisting of toluene, p-xylene, 1-methylnaphthalene, 2,4,6-dimethylaminophenol, benzylalcohol, 2,6-dimethylcyclohexanone, 3,5-lutidine, cyclohexanone, aniline, pyridine, 2-fluoroacetylphenone, 1-fluorodecane, 2,4-difluorobenzophenone, 2-fluoro-3-trifluoromethylaniline, 2-fluoroaniline, 4-fluoroaniline, 3-trifluoromethylacetophenone, 2-trifluoromethylacetophenone, bis(2,2,2-trifluoroethyl)methylphosphonate, 4-fluoro-3-(trifluoromethyl) benzaldehyde and mixtures thereof.

Other exemplary classes of protic non-aqueous liquids that may be used according to this class of solvent systems include, but are not limited to the following: optionally substituted phenols; and nitrogen heterocycles. Optionally substituted phenols useful in the invention are understood to mean phenols wherein one or more of the hydrogen atoms on the phenyl ring may be replaced with a substituent. Non-limiting, exemplary replacement groups for one or more of the hydrogen atoms on the phenyl ring include $C_1$-$C_6$ alkyl, $C_1$-$C_6$ alkoxy, and halo. Nitrogen heterocycles are understood to mean any cyclic compound including at least one nitrogen atom in the ring structure (including but not limited to imidazoles, pyrazoles, and triazoles) and being optionally substituted such that one or more of the hydrogen atoms on the ring structure may be replaced with a substituent. In certain embodiments, at least one nitrogen atom in the ring structure has an acidic hydrogen atom with a pKa lower than about 15 (e.g., between about 8 and about 15). Non-limiting, exemplary replacement groups for one or more of the hydrogen atoms on the ring include $C_1$-$C_6$ alkyl, $C_1$-$C_6$ alkoxy, and halo.

In some specific embodiments, the non-aqueous liquid is a relatively acidic component selected from the group consisting of: 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole, 2-fluorophenol, 3-fluorophenol, 4-fluorophenol, 2-trifluoromethylphenol, 3-trifluoromethylphenol, 4-trifluoromethylphenol, and mixtures thereof.

One exemplary combination of two nucleophilic amines and two non-aqueous liquids is shown in FIG. 1B). The combination of mixtures of hydrophobic nucleophilic amines and non-aqueous liquids can, in some embodiments, provide certain advantages as compared with solvents involving only a single hydrophobic amine and a single non-aqueous liquids (e.g., as described in International Application No. PCT/US2011/050452 to Lail et al., filed Sep. 3, 2011, which is incorporated herein by reference). In some embodiments, such mixed solvent systems are more desirable because they enable control over important solvent properties such as viscosity, heat capacity, reaction heat, water content, and/or may prevent formation of precipitates in some non-blended formulations that affect the performance and cost-effectiveness of an acid gas removal process.

Typically, the non-aqueous liquids used in this type of solvent system are active components of the solvent system (i.e., not serving only as diluents). Although the present solvent system is described as comprising one or more non-aqueous liquids, it is noted that, in a related embodiment, one or more of the non-aqueous liquids can be a diluent. Thus, the present disclosure also, in certain embodiments, relates to mixtures containing two or more nucleophilic amines and two or more components selected from the group consisting of non-aqueous liquids and diluents.

III. Mixtures Containing Nucleophilic Amine(s), Non-Nucleophilic Nitrogenous Base(s), and Non-Aqueous Liquid(s)

In one aspect of the invention, solvent systems can comprise mixtures of one or more nucleophilic amines, one or more non-nucleophilic nitrogenous bases, and one or more non-aqueous liquids. The properties of the solvents are altered in such formulations as compared to non-blended formulations and can advantageously be used to meet specific process requirements for gas treatment. In such an embodiment, the solvent system may react reversibly with carbon dioxide and other acid gases.

In certain embodiments, nucleophilic amines that can be used in this type of solvent formulation can be primary and/or secondary amines which have reactive nitrogen centers. A primary amine is understood to be a compound of the formula $NH_2R$, where R can be a carbon-containing group, including but not limited to $C_1$-$C_{20}$ alkyl. A secondary amine is understood to be a compound of the formula $NHR_1R_2$, wherein $R_1$ and $R_2$ are independently carbon-containing groups, including but not limited to $C_1$-$C_{20}$ alkyl. One or more of the hydrogens on R, $R_1$, and $R_2$ may optionally be replaced with one or more substituents. For example, one or more of the hydrogens on R, $R_1$, or $R_2$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

In certain embodiments, primary or secondary amines may be selected from amines functionalized with fluorine-containing-alkyl-aromatic groups. In specific embodiments, the amine may be selected from the group consisting of 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 2-fluorobenzylamine, 3-fluorobenzylamine, 4-fluorobenzylamine, 4,4,5,5,6,6,7,7,8,8,9,9,10,10,11,11,11-heptadecafluoroundecylamine, 2,3-difluorobenzylamine, 2,4-difluorobenzylamine, 2,6-difluorobenzylamine, 3,4-difluorobenzylamine 3,5-difluorobenzylamine, 2-trifluormethylbenzylamine, 3-trifluormethylbenzylamine, 4-trifluormethylbenzylamine, D-4-fluoro-alpha-methylbenzylamine, and L-4-fluoro-alpha-methylbenzylamine.

In some embodiments, the nucleophilic amines that can be used in such solvent systems can comprise cyclic amines, diamines, primary and/or secondary alcoholamines. Cyclic amines are amines wherein the nitrogen atom forms part of the ring structure, and may include, but are not limited to, aziridines, azetidines, pyrrolidines, piperidines, piperazines, pyridines, and pyrimidines. Cyclic amines may comprise one or more rings and may optionally be substituted with one or more substituents as listed above. In some embodiments, the nucleophilic amine may be a diamine. In some embodiments, the nucleophilic amine may be a primary or secondary alcoholamine. Alcoholamines are also known as amino alcohols and contain both an alcohol and amine group. The amine group of the alcoholamine may be any type of amine as disclosed herein.

Generally, such compounds can react to form bonds with non-hydrogen atoms in acid gas components. These reactions may result in the formation of, for instance, carbamate salts, mixed carbamate salts, zwitterions, sulfamates, and/or sulfamic acids. It is advantageous for the nucleophilic amines to have low water content (e.g., <about 10 wt % water) and readily form a separate liquid phase when saturated with water. Exemplary nucleophilic amines for use in these types of solvent systems include, but are not limited to, alkyl fluoroaromatic amines such as 3-fluoro-N-methylbenzylamine, 4-fluoro-N-methylbenzylamine, 2-fluorophenethylamine, 3-fluorophenethylamine, and 4-fluorophenethylamine.

The non-nucleophilic, nitrogenous base component(s) in this type of solvent system can vary. In certain embodiments, non-nucleophilic nitrogenous bases which have low water content (e.g., <about 20% water or <about 10 wt % water at 25° C.) are used, which will readily form a separate liquid-phase when combined with water. Advantageously therefore, certain non-nucleophilic, nitrogenous bases useful in such solvent systems can be hydrophobic and/or substantially immiscible with water, where "substantially immiscible with water" is as described elsewhere in the present application. One exemplary type of non-nucleophilic nitrogenous base useful in this type of solvent system is a guanidine or substituted guanidine (e.g., a fluorinated guanidine).

Guanidines are understood to be compounds of the structure $RNC(NR_1R_2)_2$, wherein R, $R_1$, and $R_2$ are independently H or carbon-containing groups, including but not limited to $C_1$-$C_{20}$ alkyl. One or more of the hydrogen atoms on R, $R_1$, and/or $R_2$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

Another type of non-nucleophilic nitrogenous base that may be used in such solvent systems is an amidine, including but not limited to a carboxamidine/carboximidamide, which is understood to be a compound of the structure $RC(=NH)NR_1R_2$, wherein R, $R_1$, and $R_2$ are independently H or carbon-containing groups, including but not limited to $C_1$-$C_{20}$ alkyl. One or more of the hydrogen atoms on R, $R_1$, and/or $R_2$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

Exemplary guanidines and amidines include, but are not limited to, 1,1,3,3-tetramethylguanidine ("TMG"); N-tert-butyl-1,1,3,3-tetramethylguanidine, diphenylguanidine, ditolylguanidine, 1,8-diazabicyclo(5.4.0)undec-7-ene, 1,1,3-trimethyl-3-(2,2,3,3-tetrafluoropropyl)guanidine; 1,1,3-trimethyl-3-(2,2,3,3,3-pentafluoropropyl)guanidine; 1,3-dimethyl-1,3-bis(2,2,2-trifluoroethyl)guanidine; 1,3-bis(2,2,3,3-tetrafluoropropyl)guanidine; 1,3-bis(4-fluorophenyl)guanidine; 1,3-bis(3-fluorophenyl)guanidine; 1,3-bis(2-fluorophenyl)guanidine; 2-(2,2,2-trifluoroethyl)-1,4,5,6,-tetrahydropyrimidine; 2-(2,2,3,3-tetrafluoropropyl)-1,4,5,6,-tetrahydropyrimidine; 3,3,4,4-tetrafluoro-N,N-dimethylbutanimidamide; 3,3,3-trifluoro-N,N-dimethylpropanimidamide; and mixtures thereof. Other non-nucleophilic, nitrogenous bases can also be used as the non-nucleophilic, nitrogenous base component of such solvent systems, e.g., including, but not limited to, tertiary amines (e.g., fluorinated tertiary amines).

Advantageously, non-aqueous liquids used within the solvent systems described herein can have low water content (e.g., <about 10 wt % water) and/or low water solubility. Exemplary classes of non-aqueous liquids that may be used according to this class of solvent systems include, but are not limited to the following: fluorinated alcohols; optionally substituted phenols; and nitrogen heterocycles. Particularly preferred according to this particular type of solvent system are fluorinated alcohols (e.g., a fluorinated alcohol with five or more carbons, preferably with low water content (e.g., <about 10 wt % water)). Fluorinated alcohols useful according to the present disclosure may comprise any compound having the formula R—OH, where R is an alkyl group (e.g., $C_1$-$C_{10}$ alkyl, $C_1$-$C_8$ alkyl, $C_1$-$C_6$ alkyl, $C_2$-$C_{10}$ alkyl, $C_2$-$C_8$ alkyl, $C_2$-$C_6$ alkyl, $C_3$-$C_{10}$ alkyl, $C_3$-$C_8$ alkyl, or $C_3$-$C_6$ alkyl) and wherein one or more hydrogen atoms of the alkyl group is substituted with fluorine. In some embodiments, the number of hydrogen atoms replaced with fluorine can be two, three, four, five, six, seven, eight, nine, or even more as may be deemed useful. In further embodiments, one or more of the hydrogen atoms of the alkyl group may optionally be replaced with one or more other substituents, including, but not limited to, $C_1$-$C_6$ alkyl, $C_1$-$C_6$ alkoxy, and halo substituents.

Optionally substituted phenols useful in the invention are understood to mean phenols wherein one or more of the hydrogen atoms on the phenyl ring may be replaced with a substituent. Non-limiting, exemplary replacement groups for one or more of the hydrogen atoms on the phenyl ring include $C_1$-$C_6$ alkyl, $C_1$-$C_6$ alkoxy, and halo. Nitrogen heterocycles are understood to mean any cyclic compound including at least one nitrogen atom in the ring structure (including but not limited to imidazoles, pyrazoles, and triazoles) and being optionally substituted such that one or more of the hydrogen atoms on the ring structure may be replaced with a substituent. In certain embodiments, at least one nitrogen atom in the ring structure has an acidic hydrogen atom with a pKa lower than about 15 (e.g., between about 8 and about 15). Non-limiting, exemplary replacement groups for one or more of the hydrogen atoms on the ring include $C_1$-$C_6$ alkyl, $C_1$-$C_6$ alkoxy, and halo.

In some specific embodiments, the non-aqueous liquid is a relatively acidic component selected from the group consisting of: 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 4-propoxyphenol; imidazole; benzimidazole; N-methyl imidazole; 1-trifluoroacetylimidazole; 1,2,3-triazole; 1,2,4-triazole; 2-trifluoromethylpyrazole; 3,5-bistrifluoromethylpyrazole; 3-trifluoromethylpyrazole, 2-fluorophenol, 3-fluorophenol, 4-fluorophenol, 2-trifluoromethylphenol, 3-trifluoromethylphenol, 4-trifluoromethylphenol, and mixtures thereof. Typically, the non-aqueous liquids used in this type of solvent system are active components of the solvent system (i.e., not serving only as diluents).

When reacted with an acid gas, such as carbon dioxide, a solvent comprising one or more nucleophilic amines, one or more non-nucleophilic, nitrogenous bases, and one or more protic non-aqueous liquids will form two products, as shown in FIG. 1C). The product formed by reaction of the nucleophilic amine with carbon dioxide will be an amine carbamate salt. The reaction of the non-nucleophilic nitrogenous base and the protic non-aqueous liquid with carbon dioxide results in the formation of a carbonate ester. The solvent system therefore has a higher theoretical carbon dioxide loading than a pure nucleophilic amine solvent. Addition of the amine to the non-nucleophilic nitrogenous base solution improves the solvent system by significantly lowering the viscosity of the viscous ionic liquid. The addition of the nucleophilic amine to the non-nucleophilic nitrogenous base and protic non-aqueous liquid solvent system will improve the segregation of water from the non-nucleophilic nitrogenous base. The molar ratio of nucleophilic amine(s) to non-nucleophilic nitrogenous base(s) can cover a broad range. Similarly, the molar ratio of nucleophilic amine(s) to non-nucleophilic nitrogenous base(s) to protic non-aqueous liquid can also cover a broad range.

IV. Neat, Hydrophobic, Nucleophilic Amine

In another aspect of the invention, neat, hydrophobic, non-aqueous solvents can be provided. Specifically, a neat solvent according to the invention can consist of a single nucleophilic amine. The term "neat" as used herein can mean that no other cosolvent is present in the solvent system, may mean that little to no other liquid is present in the solvent system (e.g., including situations wherein the solvent system comprises a small amount of undesired water, e.g., <about 10 wt %), or may mean that no other reactive component is present in the solvent system (i.e., which could react with the hydrophobic, nucleophilic amine, the acidic gas, or both). A neat hydrophobic nucleophilic amine can, in some embodiments, comprise a mixture of hydrophobic nucleophilic amines, but preferably comprises a single hydrophobic nucleophilic amine component. In some embodiments, a "neat" hydrophobic, nucleophilic amine solvent system consists of a neat hydrophobic nucleophilic amine and an acidic gas. Neat, hydrophobic nucleophilic amines can react with acid gas components such as $CO_2$ and $SO_2$ to form amine carbamate salts, Zwitterionic sulfamic acids, and/or sulfate salts, and in certain embodiments, no additional diluent is required to prevent precipitate formation.

One exemplary hydrophobic, nucleophilic amine suitable for this purpose is 3-fluoro-N-methylbenzylamine, as shown in FIG. 1D). However, the invention is not intended to be limiting, and other hydrophobic, nucleophilic amines capable of reacting in this way are intended to be encompassed by the present disclosure.

For example, hydrophobic, nucleophilic amines that can be used to form certain exemplary neat solvent systems of this type can, in some embodiments, be primary and/or secondary amines which have reactive nitrogen centers. A primary amine is understood to be a compound of the formula $NH_2R$, where R can be a carbon-containing group, including but not limited to $C_1$-$C_{20}$ alkyl. A secondary amine is understood to be a compound of the formula $NHR_1R_2$, wherein $R_1$ and $R_2$ are independently carbon-containing groups, including but not limited to $C_1$-$C_{20}$ alkyl. One or more of the hydrogens on R, $R_1$, and $R_2$ may optionally be replaced with one or more substituents. For example, one or more of the hydrogens on R, $R_1$, or $R_2$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

In certain embodiments, primary or secondary amines may be selected from amines functionalized with fluorine-containing-alkyl-aromatic groups. In specific embodiments, the amine may be selected from the group consisting of 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 2-fluorobenzylamine, 3-fluorobenzylamine, 4-fluorobenzylamine, 4,4,5,5,6,6,7,7,8,8,9,9,10,10,11,11,11-heptadecafluoroundecylamine, 2,3-difluorobenzylamine, 2,4-difluorobenzylamine, 2,6-difluorobenzylamine, 3,4-difluorobenzylamine 3,5-difluorobenzylamine, 2-trifluormethylbenzylamine, 3-trifluormethylbenzylamine, 4-trifluormethylbenzylamine, D-4-fluoro-alpha-methylbenzylamine, and L-4-fluoro-alpha-methylbenzylamine.

In some embodiments, the hydrophobic, nucleophilic amines that can be used in such solvent systems can comprise cyclic amines, diamines, primary and/or secondary alcoholamines. Cyclic amines are amines wherein the nitrogen atom forms part of the ring structure, and may include, but are not limited to, aziridines, azetidines, pyrrolidines, piperidines, piperazines, pyridines, and pyrimidines. Cyclic amines may comprise one or more rings and may optionally be substituted with one or more substituents as listed above. In some embodiments, the nucleophilic amine may be a diamine. In some embodiments, the nucleophilic amine may be a primary or secondary alcoholamine. Alcoholamines are also known as amino alcohols and contain both an alcohol and amine group. The amine group of the alcoholamine may be any type of amine as disclosed herein. Notably, to function as a neat hydrophobic amine solvent, some nucleophilic amines (e.g., cyclic amines) are preferably functionalized with fluorine-containing groups.

The neat hydrophobic nucleophilic amine solvent preferably has a low water content (e.g., <about 10 wt %) and forms a separate liquid phase with water. There are several advantages to a non-aqueous solvent process for acid-gas removal by utilization of a neat hydrophobic amine solvent. First, the low heat capacity of the neat amine solvent significantly reduces the sensible heat requirement of the solvent. Second, treatment of process water that has come in contact with the solvent will be simplified due to the reduction in the number of components in the solvent mixture. A relatively small set of secondary amines do not require diluents to avoid precipitate formation upon reaction with acid gases (neat nucleophilic amines). Of this small set, many are not suitable for treatment of industrial acid-gas containing gas streams due to miscibility with water. Since many of the industrial acid-gas containing gas streams (e.g., combustion flue gases, cement kiln gases, natural gas, synthesis gases, etc.) may contain high concentrations of water (typically about 2-30 vol %), neat secondary amines having water miscibility will strip water from the gas stream, thus creating a mixture with the water. To avoid this mixture formation, the neat secondary amine is advantageously selected such that it has very low water miscibility. As a result, in such embodiments, the solvent of the acid gas removal process can be considered to consist of or consist essentially of a single component.

V. Mixtures Containing Nucleophilic Amine(s) and Non-Nucleophilic Nitrogenous Base(s)

In another aspect of the invention, acid gas components (e.g., carbon dioxide), can be separated from gas mixtures using a combination of one or more nucleophilic amines and one or more non-nucleophilic nitrogenous bases. In some embodiment, no diluents are contained in such solvent systems (e.g., a "neat" mixture of nucleophilic amine(s) and non-nucleophilic nitrogenous bases is provided). However, embodiments with one or more added diluents are also encompassed within this class of solvent systems. Preferably, solvent systems comprising a nucleophilic amine and non-nucleophilic nitrogenous base comprise a mixture of a hydrophobic nucleophilic amine and a hydrophobic, non-nucleophilic nitrogenous base with a total water content of less than 10 wt %.

Nucleophilic amines that can be used to form certain exemplary solvent systems of this type can be primary and/or secondary amines which have reactive nitrogen centers. A primary amine is understood to be a compound of the formula $NH_2R$, where R can be a carbon-containing group, including but not limited to $C_1$-$C_{20}$ alkyl. A secondary amine is understood to be a compound of the formula $NHR_1R_2$, wherein $R_1$ and $R_2$ are independently carbon-containing groups, including but not limited to $C_1$-$C_{20}$ alkyl. One or more of the hydrogens on R, $R_1$, and $R_2$ may optionally be replaced with one or more substituents. For example, one or more of the hydrogens on R, $R_1$, or $R_2$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

In certain embodiments, primary or secondary amines may be selected from amines functionalized with fluorine-containing-alkyl-aromatic groups. In specific embodiments, the amine may be selected from the group consisting of 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 2-fluorobenzylamine, 3-fluorobenzylamine, 4-fluorobenzylamine, 4,4,5,5,6,6,7,7,8,8,9,9,10,10,11,11,11-heptadecafluoroundecylamine, 2,3-difluorobenzylamine, 2,4-difluorobenzylamine, 2,6-difluorobenzylamine, 3,4-difluorobenzylamine 3,5-difluorobenzylamine, 2-trifluormethylbenzylamine, 3-trifluormethylbenzylamine, 4-trifluormethylbenzylamine, D-4-fluoro-alpha-methylbenzylamine, and L-4-fluoro-alpha-methylbenzylamine.

In some embodiments, the nucleophilic amines that can be used in such solvent systems can comprise cyclic amines, diamines, primary and/or secondary alcoholamines. Cyclic amines are amines wherein the nitrogen atom forms part of the ring structure, and may include, but are not limited to, aziridines, azetidines, pyrrolidines, piperidines, piperazines, pyridines, and pyrimidines. Cyclic amines may comprise one or more rings and may optionally be substituted with one or more substituents as listed above. In some embodiments, the nitrogenous base may be a diamine. In some embodiments, the nitrogenous base may be a primary or secondary alcoholamine. Alcoholamines are also known as amino alcohols and contain both an alcohol and amine group. The amine group of the alcoholamine may be any type of amine as disclosed herein.

The non-nucleophilic, nitrogenous base component(s) in this type of solvent system can vary. In certain embodiments, non-nucleophilic nitrogenous bases which have low water content (e.g., <about 20% water or <about 10 wt % water at 25° C.) are used, which will readily form a separate liquid-phase when combined with water. Advantageously therefore, certain non-nucleophilic, nitrogenous bases useful in such solvent systems can be hydrophobic and/or substantially immiscible with water, where "substantially immiscible with water" is as described elsewhere in the present application. Exemplary types of non-nucleophilic nitrogenous base useful in this type of solvent system are guanidines or substituted guanidines (e.g., fluorinated guanidines), amidines (e.g., fluorinated amidines), or tertiary amines (e.g., fluorinated tertiary amines).

Guanidines are understood to be compounds of the structure $RNC(NR_1R_2)_2$, wherein R, $R_1$, and $R_2$ are independently H or carbon-containing groups, including but not limited to $C_1$-$C_{20}$ alkyl. One or more of the hydrogen atoms on R, $R_1$, and/or $R_2$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

Amidines include, but are not limited to a carboxamidine/carboximidamide, which is understood to be a compound of the structure $RC(=NH)NR_1R_2$, wherein R, $R_1$, and $R_2$ are independently H or carbon-containing groups, including but not limited to $C_1$-$C_{20}$ alkyl. One or more of the hydrogen atoms on R, $R_1$, and/or $R_2$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

Exemplary guanidines and amidines include, but are not limited to, 1,1,3,3-tetramethylguanidine ("TMG"); N-tert-butyl-1,1,3,3-tetramethylguanidine, diphenylguanidine, ditolylguanidine, 1,8-diazabicyclo(5.4.0)undec-7-ene, 1,1,3-trimethyl-3-(2,2,3,3-tetrafluoropropyl)guanidine; 1,1,3-trimethyl-3-(2,2,3,3,3-pentafluoropropyl)guanidine; 1,3-dimethyl-1,3-bis(2,2,2-trifluoroethyl)guanidine; 1,3-bis(2,2,3,3-tetrafluoropropyl)guanidine; 1,3-bis(4-fluorophenyl)guanidine; 1,3-bis(3-fluorophenyl)guanidine; 1,3-bis(2-fluorophenyl)guanidine; 2-(2,2,2-trifluoroethyl)-1,4,5,6,-tetrahydropyrimidine; 2-(2,2,3,3-tetrafluoropropyl)-1,4,5,6,-tetrahydropyrimidine; 3,3,4,4-tetrafluoro-N,N-dimethylbutanimidamide; 3,3,3-trifluoro-N,N-dimethylpropanimidamide; and mixtures thereof.

A tertiary amine is understood to be a compound of the formula $NR_1R_2R_3$, wherein $R_1$, $R_2$, and $R_3$ are independently carbon-containing groups, including but not limited to $C_1$-$C_{20}$ alkyl. One or more of the hydrogens on R, $R_1$, $R_2$, and $R_3$ may optionally be replaced with one or more substituents. For example, one or more of the hydrogens on R, $R_1$, $R_2$, and $R_3$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkylaryl; optionally substituted arylalkyl; optionally substituted aryloxy; optionally substituted heteroaryl; optionally substituted heterocycle; halo (e.g., Cl, F, Br, and I); hydroxyl; halogenated alkyl (e.g., $CF_3$, 2-Br-ethyl, $CH_2F$, $CH_2CF_3$, and $CF_2CF_3$); halogenated aryl; halogenated alkylaryl; halogenated benzyl; optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl).

Certain exemplary formulations include, but are not limited to, one or more primary and/or secondary amines, including alkyl fluoroaromatic amines such as 3-fluoro-N-methylbenzylamine, 4-fluoro-N-methylbenzylamine, 2-fluorophenethylamine, 3-fluorophenethylamine, and 4-fluorophenethylamine used in combination with one or more tertiary amines (e.g., fluorinated tertiary amines), guanidines (e.g., fluorinated guanidines), and/or amidines (e.g., fluorinated amidines).

In some specific embodiments, this type of solvent system can consist of a secondary amine and guanidine as shown in FIG. 1E). In certain embodiments, the formulated solvent (i.e., a mixture containing nucleophilic amine(s) and non-nucleophilic nitrogenous base(s)) reacts with carbon dioxide to form a carbamate salt (e.g., a mixed carbamate salt). In the reaction product, the nucleophilic amine component forms a carbon-nitrogen bond with $CO_2$ (or another acid gas) and the non-nucleophilic amine component forms a bond with a hydrogen nucleus (proton). The structure of the product formed is a mixed amine carbamate salt. The molar ratio of non-nucleophilic amine(s) to nucleophilic amine(s) can cover a broad range. The mixture of nucleophilic with non-nucleophilic bases may improve the kinetics of carbon dioxide absorption and increase the carbon dioxide loading at a given temperature (carbon-dioxide vapor-liquid-equilibrium) due to improved thermodynamics. Compared to a conventional $CO_2$ capture from a solution utilizing a single nucleophilic amine, the mixed solvent in certain embodiments will absorb more $CO_2$ at slightly higher temperatures, making the solvent preferable for separation of $CO_2$ from gas streams in certain temperature ranges.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A solvent system comprising a solution formed of a first nucleophilic amine, in combination with:
a non-nucleophilic, nitrogenous base and a protic non-aqueous liquid, wherein the non-nucleophilic, nitrogenous base and non-aqueous liquid react with carbon dioxide to form a carbonate ester or a heteroatom analogue of a carbonate ester and/or the first nucleophilic amine reacts with the carbon dioxide to form a mixed carbamate salt.

2. The solvent system of claim 1, wherein the first nucleophilic amine is hydrophobic.

3. The solvent system of claim 1, wherein the non-nucleophilic, nitrogenous base is hydrophobic or has a solubility with water of less than about 20 g of solvent per 100 mL of water.

4. The solvent system of claim 1, wherein the solvent system has a solubility with water of less than about 20 g of solvent per 100 mL of water.

5. The solvent system of claim 1,
wherein the first nucleophilic amine is selected from the group consisting of 3-fluoro-N-methylbenzylamine, 4-fluoro-N-methylbenzylamine, 2-fluorophenethylamine, 3-fluorophenethylamine, 4-fluorophenethylamine, and mixtures thereof.

6. The solvent system of claim 1,
wherein the non-nucleophilic nitrogenous base is a guanidine or substituted guanidine.

7. The solvent system of claim 1,
wherein
the protic non-aqueous liquid is a fluorinated alcohol with five or more carbons.

8. The solvent system of claim 1, wherein the nucleophilic amine is a cyclic amine, diamine, primary alcoholamine, or secondary alcoholamine.

9. The solvent system of claim 1, wherein the non-nucleophilic, nitrogenous base is selected from the group consisting of 1,1,3,3-tetramethylguanidine ("TMG"); N-tert-butyl-1,1,3,3-tetramethylguanidine, diphenylguanidine, ditolylguanidine, 1,8-diazabicyclo(5.4.0)undec-7-ene, 1,1,3-trimethyl-3-(2,2,3,3-tetrafluoropropyl)guanidine; 1,1,3-trimethyl-3-(2,2,3,3,3-pentafluoropropyl)guanidine; 1,3-dimethyl-1,3-bis(2,2,2-trifluoroethyl)guanidine; 1,3-bis(2,2,3,3-tetrafluoropropyl)guanidine; 1,3-bis(4-fluorophenyl)guanidine; 1,3-bis(3-fluorophenyl)guanidine; 1,3-bis(2-fluorophenyl)guanidine; 2-(2,2,2-trifluoroethyl)-1,4,5,6,-tetrahydropyrimidine; 2-(2,2,3,3-tetrafluoropropyl)-1,4,5,6-tetrahydropyrimidine; 3,3,4,4-tetrafluoro-N,N-dimethylbutanimidamide; 3,3,3-trifluoro-N,N-dimethylpropanimidamide; and mixtures thereof.

10. The solvent system of claim 1, wherein the protic non-aqueous liquid is selected from the group consisting of optionally substituted fluorinated alcohols, optionally substituted phenols, and optionally substituted nitrogen heterocycles.

11. The solvent system of claim 1, wherein the protic non-aqueous liquid is selected from the group consisting of 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; 4-methoxyphenol ("4-MeOPh"); 4-ethoxyphenol ("4-EtOPh"); 2-ethoxyphenol; 4-propoxyphenol; imidazole; benzimidazole; 1,2,3-triazole; 1,2,4-triazole; 3,5-bistrifluoromethylpyrazole; 3-trifluoromethylpyrazole, 2-fluorophenol, 3-fluorophenol, 4-fluorophenol, 2-trifluoromethylphenol, 3-trifluoromethylphenol, 4-trifluoromethylphenol, and mixtures thereof.

12. The solvent system of claim 1, wherein the solvent system has a solubility with water of less than about 10 g of solvent per 100 mL of water.

* * * * *